United States Patent

Bogauchi et al.

[11] Patent Number: 5,489,314
[45] Date of Patent: Feb. 6, 1996

[54] MANUFACTURING METHOD OF NICKEL PLATE AND MANUFACTURING METHOD OF ALKALINE BATTERY

[75] Inventors: Takehito Bogauchi; Tomonori Kishimoto; Hiroe Nakagawa; Yoshihiro Eguchi; Mitsuo Yamane, all of Takatsuki, Japan

[73] Assignee: Yuasa Corporation, Osaka, Japan

[21] Appl. No.: 78,247

[22] PCT Filed: Oct. 20, 1992

[86] PCT No.: PCT/JP92/01359

§ 371 Date: Oct. 14, 1993

§ 102(e) Date: Oct. 14, 1993

[87] PCT Pub. No.: WO93/08611

PCT Pub. Date: Apr. 29, 1993

[30] Foreign Application Priority Data

Oct. 21, 1991 [JP] Japan .................................... 3-302324

[51] Int. Cl.$^6$ .................................................... H01M 4/04
[52] U.S. Cl. ......................................... 29/623.5; 427/126.6
[58] Field of Search ................... 29/2, 623.5; 427/126.6

[56] References Cited

U.S. PATENT DOCUMENTS

| | | | |
|---|---|---|---|
| 4,049,027 | 9/1977 | Seiger | 29/623.5 X |
| 4,364,422 | 12/1982 | Brown et al. | 29/623.5 X |
| 4,391,668 | 7/1983 | Armstrong | 427/126.6 X |
| 4,935,318 | 6/1990 | Ikoma et al. | 29/623.5 |

FOREIGN PATENT DOCUMENTS

| | | |
|---|---|---|
| 0337029 | 10/1989 | European Pat. Off. . |
| 0403052 | 12/1990 | European Pat. Off. . |
| 1-200555 | 8/1989 | Japan . |

OTHER PUBLICATIONS

Patent Abstracts of Japan, vol. 008, No. 229 (E–273), Oct. 20, 1984, & JP–A–59 111264 (Nihon Denchi KK) Jun. 27, 1984—Abstract.
Patent Abstracts of Japan, vol. 008, No. 194 (E–264)), Sep. 6, 1984, & JP–A–59 083348 (Matsushita Denki Sangyo KK) May 14, 1984—Abstract.
Patent Abstracts of Japan, vol. 008, No. 256 (E–280), Nov. 22, 1984, 7 JP–A–59 128765 (Nihon Denchi KK) Jul. 24, 1984—Abstract.
Patent Abstracts of Japan, vol. 016, No. 192 (E–1199), May 11, 1992, & JP–A∝04 026058 (Yuasa Battery Co. Ltd.) Jan. 29, 1992—Abstract.
Patent Abstracts of Japan, vol. 016, No. 224 (E–1206), May 25, 1992, & JP–A–039861 (Yuasa Battery Co. Ltd.) Feb. 10, 1992—Abstract.
Patent Abstracts of Japan, vol. 016, No. 392 (E–1251), Aug. 20, 1992, & JP–A–04 129171 (Yuasa Battery Co. Ltd.), Apr. 30, 1992—Abstract.
Patent Abstracts of Japan, vol. 7, No. 272 (E–214), Dec. 3, 1983, & JP–A–58 152371 (Nihon Denchi KK), Sep. 9, 1983—Abstract.
Patent Abstracts of Japan, vol. 007, No. 166 (E–188), Jul. 21, 1958, & JP–A–58 073964 (Tokyo Shibaura Denki KK), May 4, 1983—Abstract.
Patent Abstracts of Japan, vol. 008, No. 107 (E–245), May 19, 1984, & JP–A–59 0023464 (Matsushita Denki Sangyo KK) Feb. 6, 1984—Abstract.

*Primary Examiner*—Stephen Kalafut
*Attorney, Agent, or Firm*—Evenson, McKeown, Edwards & Lenahan

[57] ABSTRACT

A method for forming a nickel plate or a method for making up an alkaline battery, in such a way that cobalt oxyhydroxide is previously formed on surfaces of positive active material powder and used therefor, by mixing the positive active material powder with CoO powder, for example, to be oxidized, by oxidizing the positive active material powder in a solution including cobalt ions, or by mixing the positive active material powder with cobalt oxyhydroxide powder. A conductive network comprising the cobalt oxyhydroxide is formed, so that conductive efficiencies between the positive active materials and the positive active material and the substrate are made better.

33 Claims, 5 Drawing Sheets

MANUFACTURING METHOD OF NICKEL PLATE AND MANUFACTURING METHOD OF ALKALINE BATTERY

This application is a national phase application of PCT application no. PCT/JP92/01359, filed in Japan on Oct. 20, 1992, published as WO 93/08610.

TECHNICAL FIELD

This invention relates to a manufacturing method of a nickel plate and manufacturing method of an alkaline battery. The nickel plate is a plate used for the alkaline battery. A nickel-zinc battery, a nickel metal-hydride battery and a nickel-cadmium battery etc. may be mentioned as the alkaline battery. These batteries are used mainly for a power supply for portable electronic equipment, a portable power supply, a power supply for electric vehicle such as an electric automobile and a scooter etc.

BACKGROUND ART

With a recent tendency of rapid decrease in weight of portable electronic equipment etc., it is required to minimize a weight and size of the alkaline battery to serve as a power supply for the equipment. That is, the alkaline battery is required to be increased in its energy density.

Various types such as a sintered type, a pasted type, a button type and a pocket type etc. have been known as the nickel plate for use as a positive electrode of the alkaline battery.

The sintered type nickel plate is one, in which powder of positive active material having a principal component of nickel hydroxide is filled in a porous sintered substrate formed by sintering nickel powder to a porous substrate such as a punched steel plate or a nickel net etc. In this electrode plate, peeling-off of nickel sintered product will occur due to weakening of mutual bonding between sintered nickel powder particles when a porosity of the substrate is increased. Therefore, a limit of practical porosity has been about 80%. For this reason, a filling density of active material has been small and only an energy density as small as about 400 mAh/cc has been obtained. Since pore diameters of the substrate have been as small as 10 microns or smaller, a method for filling the positive active material has been limited to a solution impregnation method requiring repeated troublesome processes.

The button type nickel plate is one, in which a small quantity of conductive material such as carbon powder is added to the foregoing positive active material powder, and this composite powder is pressed to be formed into a pellet shape. The pocket type nickel plate is one, in which a punched steel plate is worked to form a pocket and the foregoing positive active material powder is filled in this pocket. In these electrode plates, the positive active material powder is filled directly and the substrate to which the nickel powder is sintered is not used. Consequently, these plates have lacked in a current collecting property and offered an active material utilization efficiency as small as about 50% to 60%, so as to exert a performance considerably inferior to that of the sintered type nickel plate offering an active material utilization efficiency as large as about 90%. In order to improve these disadvantages, a measure in which fine particles such as nickel carbonyl powder are mixed to the foregoing positive active material powder is taken at present. Even by this measure, however, the performance can be improved by only about 10%. The reason why the mixed nickel carbonyl powder does not function effectively is that nickel hydroxide having a poor electric conductivity is formed on surfaces of the nickel carbonyl powder particles at a positive electrode charge/discharge potential.

The pasted type nickel plate is formed in such a way that 1 to 30 wt % of CoO (cobalt monoxide) powder are mixed to the foregoing positive active material powder, this mixture is formed into a paste by using solvent such as MC (methyl cellulose) and CMC (carboxymethyl cellulose) etc., and this paste is filled in a nickel fiber porous plate. This electrode plate is one, in which CoO is dissolved in electrolyte solution and made precipitate around the porous plate and the positive active material as $\beta\text{-}Co(OH)_2$ which is formed by charging thereafter to form a conductive network comprising $\beta\text{-}CoOOH$ having a good electric conductivity, and a discharge performance is thereby made favorable. In this electrode plate, such an aging process has been required in advance of the above charging that the plate has been put in a still condition for one to three days after filling the electrolyte solution. If the plate is not subjected to the aging process, a dissolution reaction of CoO shown in a formula (I) and a precipitation reaction of $\beta\text{-}Co(OH)_2$ shown in a formula (II) will scarcely occur, and formation reactions of conductive network shown in formulas (III) and (IV) will become difficult so as to lower an active material utilization efficiency.

$$CoO + OH^- \rightarrow HCoOC^- \qquad (I)$$

$$HCoOO^- + H_2O \rightarrow \beta\text{-}Co(OH)_2 + OH^- \qquad (II)$$

$$HCoOO^- \rightarrow CoOOH + e^- \qquad (III)$$

$$\beta\text{-}Co(OH)_2 \rightarrow \beta\text{-}CoOOH + H_2O + e^- \qquad (IV)$$

However, the pasted type nickel plate has included the following problems.

(1) Since a solubility of cobalt in the electrolyte solution is low and a quantity of the electrolyte solution is small, so that a reaction of the formula (I) does not take place sufficiently. For this reason, in order to form the conductive network sufficiently, it has been necessary to carry out the aging process for a long period or to repeat charging and discharging of several cycles, so that a productivity has been poor.

(2) Dissolved cobalt complex ions disperse to precipitate on various places as $\beta\text{-}Co(OH)_2$, so that a short-circuiting is apt to occur when they precipitate on a separator, and hydrogen gas is produced violently to lower a hydrogen overvoltage so as to increase a self-discharge at a negative electrode when they precipitate on the negative electrode, if the negative electrode is a zinc electrode. Therefore, in case when applying the nickel plate to the nickel-zinc battery, it has been necessary to assemble the nickel plate into the battery after the plate had been previously formed separately from the zinc electrode to convert CoO into $\beta\text{-}CoOOH$. For this reason, many manufacturing processes have been required and an equipment for charging has been necessary. In addition, peeling-off of the active material and breakage of the conductive network have taken place because the plate has been subjected to processes such as formation and rinsing etc., so that there have been such problems as a decrease in quantity of the active material and a lowering of the active material utilization efficiency etc.

(3) CoO is oxidized to become $Co_3O_4$ and is not converted to $\beta\text{-}CoOOH$ when it is left as it is in air.

Therefore, a battery performance based on CoO can not be obtained stably.

DISCLOSURE OF THE INVENTION

An object of this invention is to provide methods for enabling manufacturing of nickel plates and alkaline batteries having high-performances and excellent in their productivities.

A first manufacturing method of a nickel plate of this invention is characterized in that positive active material powder including a principal component of nickel hydroxide is mixed with cobalt compound powder having a grain size of 20 microns or smaller and a surface area of 10 $m^2/g$ or larger, this mixture is filled in a three-dimensional porous substrate comprising an alkali-resistant metal, and this filled substrate is oxidized by an oxidizing agent.

A second manufacturing method of a nickel plate of this invention is characterized in that positive active material powder including a principal component of nickel hydroxide is mixed with cobalt compound powder having a grain size of 20 microns or smaller and a surface area of 10 $m^2/g$ or larger, this mixture is oxidized by an oxidizing agent, and this oxide is filled in a three-dimensional porous substrate comprising an alkali-resistant metal.

A third manufacturing method of a nickel plate of this invention is characterized in that positive active material powder including a principal component of nickel hydroxide is filled in a three-dimensional porous substrate comprising an alkali-resistant metal, and this filled substrate is oxidized by an oxidizing agent in a solution including cobalt ions.

A fourth manufacturing method of a nickel plate of this invention is characterized in that positive active material powder including a principal component of nickel hydroxide is oxidized by an oxidizing agent in a solution including cobalt ions, and this oxide is filled in a three-dimensional porous substrate comprising an alkali-resistant metal.

A fifth manufacturing method of a nickel plate of this invention is characterized in that positive active material powder including a principal component of nickel hydroxide is mixed with cobalt oxyhydroxide powder, and this mixture is filled in a three-dimensional porous substrate comprising an alkali-resistant metal.

A sixth manufacturing method of a nickel plate of this invention is characterized in that positive active material powder including a principal component of nickel hydroxide is oxidized by an oxidizing agent in a solution including cobalt ions, this oxide is mixed with cobalt oxyhydroxide powder, and this mixture is filled in a three-dimensional porous substrate comprising an alkali-resistant metal.

A first manufacturing method of a alkaline battery of this invention is characterized in that a nickel plate is manufactured by any one of the first to sixth manufacturing methods of nickel plates and assembled together with a zinc electrode.

A second manufacturing method of a alkaline battery of this invention is characterized in that a nickel plate is manufactured by any one of the first to sixth manufacturing methods of nickel plates and assembled together with a metal-hydride electrode.

A third manufacturing method of a alkaline battery of this invention is characterized in that a nickel plate is manufactured by any one of the first to sixth manufacturing methods of nickel plates and assembled together with a cadmium electrode.

In this invention, the cobalt compounds and cobalt ions are oxidized by the oxidizing agent to become β-CoOOH having a good electric conductivity so as to be formed on the surface of nickel hydroxide powder forming the positive active material, so that the conductive network is formed, which improves conductive efficiencies between positive active materials and between the positive active material and the substrate.

Figure 1:
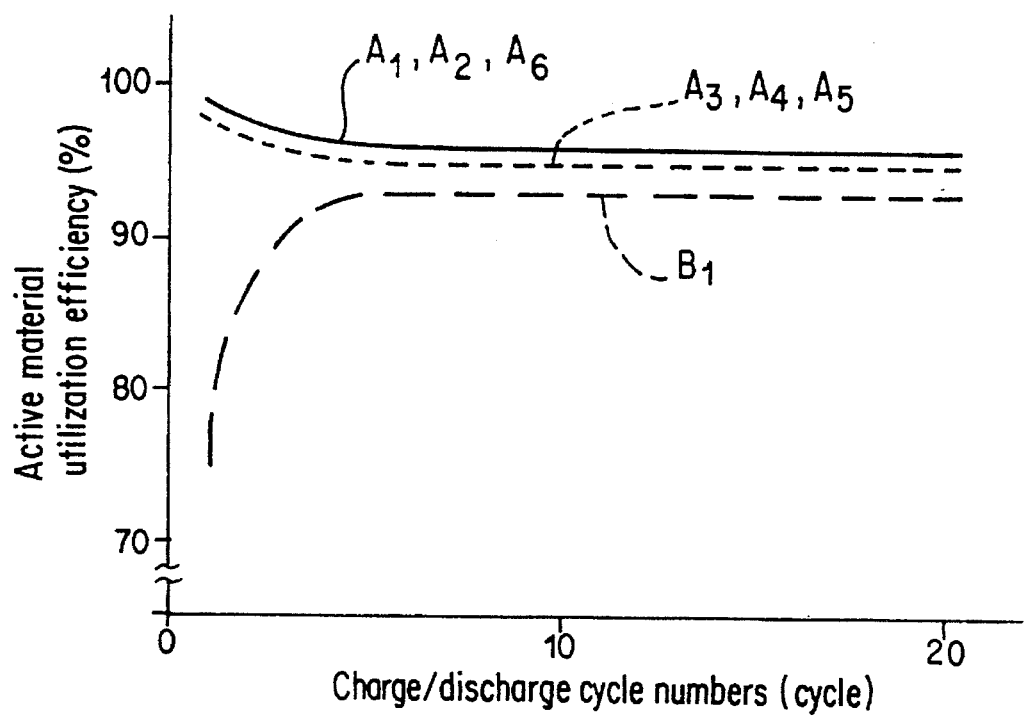
FIG. 1 is a diagram showing relations between charge/discharge cycle numbers and active material utilization efficiencies of nickel-cadmium batteries using nickel plates of embodiments 1 to 6, respectively.

BEST MODE FOR CARRYING OUT THE INVENTION (Embodiment 1)

Spherical nickel hydroxide powder including 5 wt% of cadmium hydroxide was mixed with CoO (cobalt monoxide) powder having a grain size of 1 micron and a surface area of 70 $m^2/g$ with a weight ratio of 95 to 5. This mixing procedure was done in an aqueous solution having a principal component of potassium hydroxide and having a specific gravity of 1.25, and the mixture was stirred sufficiently.

The prepared mixture was filtrated, rinsed and dried. After that, it was formed into a paste by 2 wt% of CMC (carboxymethyl cellulose) solution, filled in a substrate comprising a nickel fiber porous body, dried for 1 hour at 80° C., and then pressed.

The prepared filled substrate was put in an aqueous solution having a principal component of potassium hydroxide and having a specific gravity of 1.25, and added with $K_2S_2O_8$ (potassium peroxodisulfate) up to a molar number or more of CoO until oxygen gas was produced. After completion of the reaction, the filled substrate was rinsed, dried, pressed again, and coated with teflon on its surface. Thus, a nickel plate was prepared.

Other cobalt compounds such as cobalt hydroxide and cobalt carbonate etc. may be used in place of the CoO.

(Embodiment 2)

Spherical nickel hydroxide powder including 5 wt% of cadmium hydroxide was mixed with CoO powder having a grain size of 1 micron and a surface area of 70 $m^2/g$ with a weight ratio of 95 to 5. This mixing procedure was done in an aqueous solution having a principal component of potassium hydroxide and having a specific gravity of 1.25, and the mixture was stirred sufficiently.

In the next place, the above aqueous solution was added with $K_2S_2O_8$ up to a molar number or more of CoO until oxygen gas was produced.

After completion of the reaction, the prepared mixture was filtrated, rinsed and dried. After that, it was formed into a paste by 2 wt% of CMC solution, filled in a substrate comprising a nickel fiber porous body, dried for 1 hour at 80° C., pressed, and then coated with teflon on its surface. Thus, a nickel plate was prepared.

Other cobalt compounds such as cobalt hydroxide and cobalt carbonate etc. may be used in place of the CoO.

(Embodiment 3)

Spherical nickel hydroxide powder including 5 wt% of cadmium hydroxide was formed into a paste by 2 wt% of CMC solution, filled in a substrate comprising a nickel fiber porous body, dried for 1 hour at 80° C., and then pressed.

The prepared filled substrate was put in an aqueous solution dissolving cobalt ions to a saturated condition and having a principal component of potassium hydroxide and having a specific gravity of 1.25, and added with $K_2S_2O_8$ up to a molar number or more of cobalt ion until oxygen gas was produced. After completion of the reaction, the filled substrate was rinsed, dried, pressed, and then coated with teflon on its surface. Thus, a nickel plate was prepared.

(Embodiment 4)

Spherical nickel hydroxide powder including 5 wt% of cadmium hydroxide was put in an aqueous solution dissolving cobalt ions to a saturated condition and having a principal component of potassium hydroxide and having a specific gravity of 1.25, and added with $K_2S_2O_8$ up to a molar number or more of cobalt ion until oxygen gas was produced.

After completion of the reaction, the powder was filtrated, rinsed and dried. After that, it was formed into a paste by 2 wt% of CMC solution, filled in a substrate comprising a nickel fiber porous body, dried for 1 hour at 80° C., pressed, and then coated with teflon on its surface. Thus, a nickel plate was prepared.

(Embodiment 5)

Spherical nickel hydroxide powder including 5 wt% of cadmium hydroxide was mixed with CoOOH powder having a grain size of 1 micron with a weight ratio of 95 to 5.

The prepared mixture was filtrated, rinsed and dried. After that, it was formed into a paste by 2 wt% of CMC solution, filled in a substrate comprising a nickel fiber porous body, dried for 1 hour at 80° C., pressed, and then coated with teflon on its surface. Thus, a nickel plate was prepared.

(Embodiment 6)

Spherical nickel hydroxide powder including 5 wt% of cadmium hydroxide was put in an aqueous solution dissolving cobalt ions to a saturated condition and having a principal component of potassium hydroxide and having a specific gravity of 1.25, and added with $K_2S_2O_8$ up to a molar number or more of cobalt ion until oxygen gas was produced.

After completion of the reaction, the powder was filtrated, rinsed and dried. The prepared powder was mixed with CoOOH powder having a grain size of 1 micron with a weight ratio of 95 to 5.

The prepared mixture was filtrated, rinsed and dried. After that, it was formed into a paste by 2 wt% of CMC solution, filled in a substrate comprising a nickel fiber porous body, dried for 1 hour at 80° C., pressed, and then coated with teflon on its surface. Thus, a nickel plate was prepared.

(Comparison example 1)

Spherical nickel hydroxide powder including 5 wt% of cadmium hydroxide was mixed with CoO powder having a grain size of 1 micron and a surface area of 70 $m^2/g$ with a weight ratio of 95 to 5. This mixing procedure was done in an aqueous solution having a principal component of potassium hydroxide and having a specific gravity of 1.25, and the mixture was stirred sufficiently.

The prepared mixture was filtrated, rinsed and dried. After that, it was formed into a paste by 2 wt% of CMC solution, filled in a substrate comprising a nickel fiber porous body, dried for 1 hour at 80° C., pressed, and then coated with teflon on its surface. Thus, a nickel plate was prepared.

The nickel plates prepared by the embodiments 1 to 6 and the comparison example 1 were used as positive electrodes respectively to be combined with negative electrodes comprising pasted type cadmium plates and separators comprising polyamide nonwoven fabrics, so that nickel-cadmium batteries $A_1$ to $A_6$ and $B_1$ having nominal capacity of 2.0 Ah were assembled. The batteries $A_1$ to $A_6$ represent those using the nickel plates of embodiments 1 to 6 and the battery $B_1$ represents that using the nickel plate of comparison example 1. An aqueous solution having a principal component of potassium hydroxide and having a specific gravity of 1.25 was used as the electrolyte solution. The electrolyte solution was filled to a level for dipping 90% of volumes of the positive electrode, negative electrode and separator. The battery $B_1$ was subjected to the aging process after filling the electrolyte solution and subjected to the formation by charging.

The batteries $A_1$ to $A_6$ and $B_1$ were investigated in regard to the relations between charge/discharge cycle numbers and active material utilization efficiency. A charging was done with a charging current of 0.1 CA for 11 hours, and a discharging was done with a discharging current of 0.2 CA. Results are shown in FIG. 1.

Figure 2:
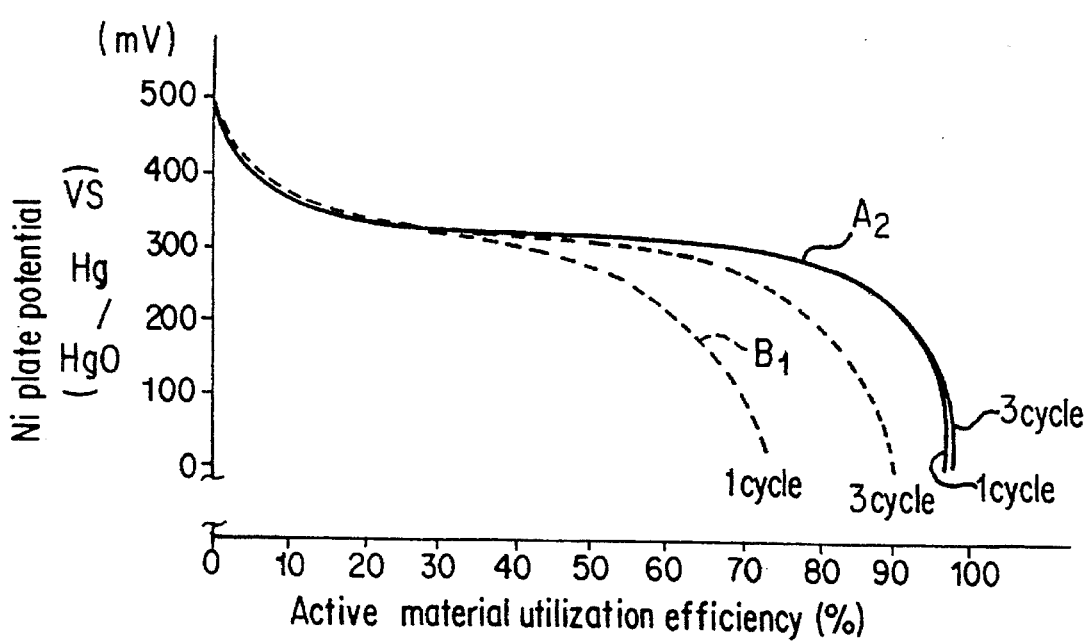
FIG. 2 is a diagram showing discharge characteristics of first cycle and third cycle of nickel-cadmium batteries using nickel plates of the embodiment 2 and a comparison example 1.

The batteries $A_2$ and $B_1$ were investigated in regard to the discharge characteristics at first cycle and third cycle. The charging and discharge condition were same with the above. Results are shown in FIG. 2.

As seen from FIG. 1, high active material utilization efficiencies are offered from the first cycle in the batteries $A_1$ to $A_6$, but the active material utilization efficiencies are small at an initial stage of cycles and about three cycles are necessary to obtain stable values in the battery $B_1$. Further, as seen from FIG. 2, the discharge capacity is stable from the first cycle in the battery $A_2$. This can be explained as follows. In the batteries $A_1$ to $A_6$, CoO and cobalt ions are oxidized by $K_2S_2O_8$ forming the oxidizing agent to become β-CoOOH having a good electric conductivity and formed on surfaces of nickel hydroxide powder particles forming the positive active material, so that the conductive network is formed which makes better the conductive efficiency between the positive active materials and between the positive active material and the substrate. In the battery $B_1$, however, when the formation is carried out by charging, CoO is not completely converted to β-CoOOH at an initial stage so that the conductive efficiency is low and charging and discharging reactions are carried out not completely. Since mixing of the positive active material powder with the CoO powder is carried out in the alkali solution in the nickel plates of batteries $A_1$ and $A_2$, the both powders can be mixed very uniformly. For this reason, β-CoOOH is formed so as to cover the surface of positive active material powder, that is, formed so as to coat the positive active material powder so that the conductive network making better the conductive efficiency is formed after all. Accordingly, the active material utilization efficiencies of the batteries $A_1$ and $A_2$ become higher.

Same effect as the above was obtained even when the nickel plates of the batteries $A_1$ to $A_6$ were used after being permitted to stand in air for a while. This is because the CoO and cobalt ions had already been oxidized by the oxidizing agent to become β-coOOH.

Figure 3:
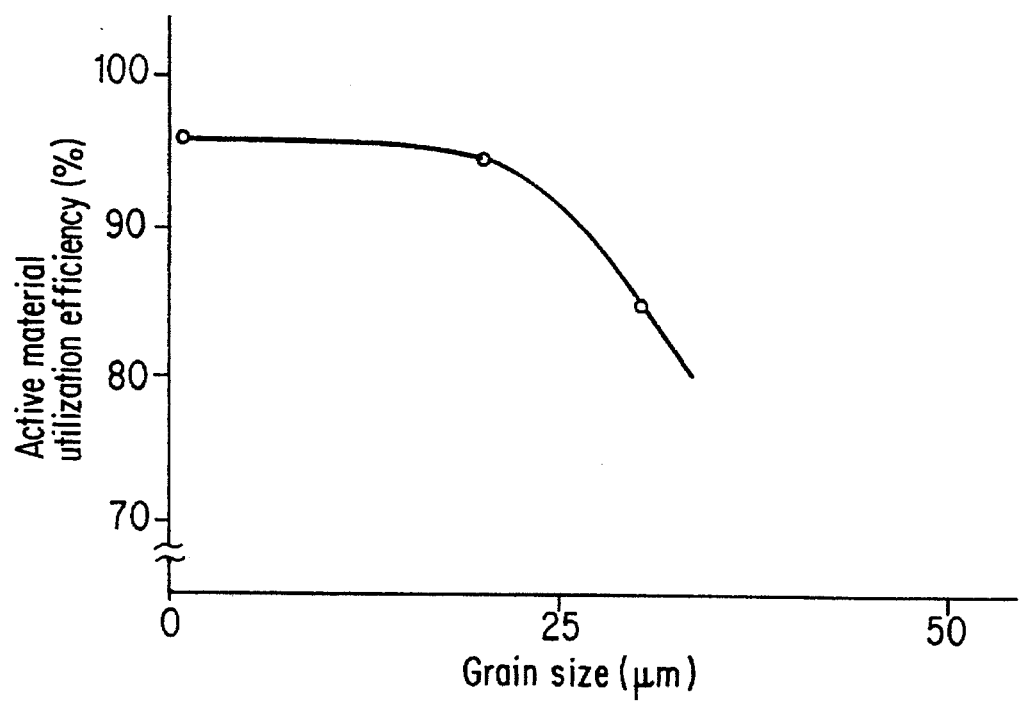
FIG. 3 is a diagram showing relations between grain sizes and active material utilization efficiencies of nickel-cadmium batteries using nickel plates made of different grain sizes of CoO in the embodiment 2.
Figure 4:
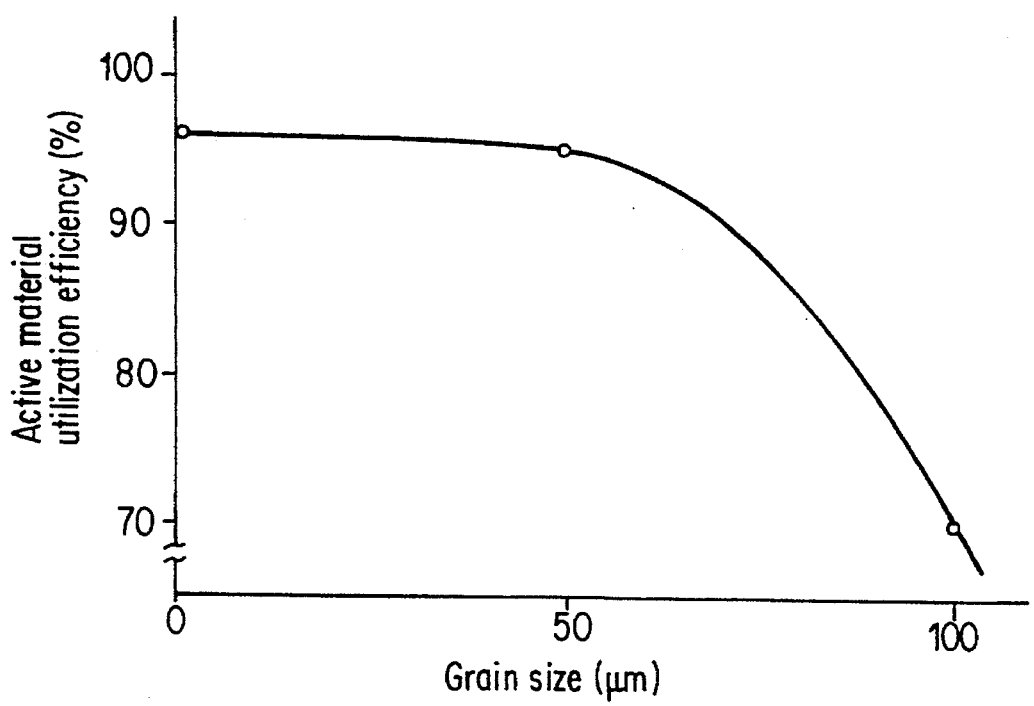
FIG. 4 is a diagram showing relations between grain sizes and active material utilization efficiencies of nickel-cadmium batteries using nickel plates made of different grain sizes of CoOOH in the embodiment 6.

Nickel plates were formed in the same way as the embodiment 2 by only changing the grain size of CoO used, as 10 microns, 20 microns and 30 microns respectively. Further, nickel plates were formed in the same way as the embodiment 6 by only changing the grain size of CoOOH used, as 10 microns, 50 microns and 100 microns respectively. Batteries same with the aboves were formed by using these nickel plates respectively, so as to investigate stabilized active material utilization efficiencies after these batteries had been subjected to several cycles of charging and discharging. Results are shown in FIG. 3 and FIG. 4. The active material utilization efficiency of CoO is decreased when the grain size exceeds 20 microns as seen from FIG. 3, and the active material utilization efficiency of CoOOH is decreased when the grain size of exceeds 50 microns as seen from FIG. 4. Accordingly, the grain size of CoO used is preferably 20 microns or smaller, and the grain size of CoOOH used is preferably 50 microns or smaller.

Figure 5:
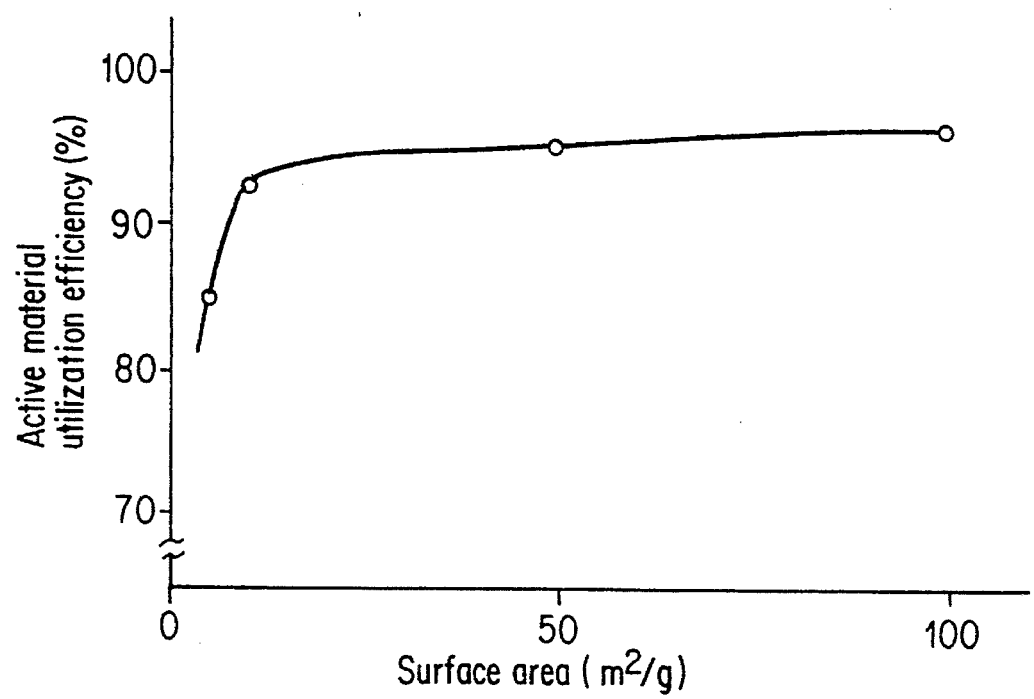
FIG. 5 is a diagram showing relations between surface areas and active material utilization efficiencies of nickel-cadmium batteries using nickel plates made of different surface areas of CoO in the embodiment 2.

Nickel plates were formed in the same way as the embodiment 2 by only changing the surface area of CoO used, as 10 $m^2/g$, 20 $m^2/g$, 50 $m^2/g$ and 100 $m^2/g$ respectively. Batteries same with the aboves were formed by using these nickel plates respectively, so as to investigate stabilized active material utilization efficiencies after these batteries had been subjected to several cycles of charging and discharging. Results are shown in FIG. 5. As seen from FIG. 5, the active material utilization efficiency is decreased when the surface area of CoO is smaller than 10 $m^2/g$. Accordingly, the surface area of CoO used is preferably 10 $m^2/g$ or larger.

(Embodiment 7)

The nickel plate same with that of the embodiment 2 was prepared in the same way as the embodiment 2. An aqueous solution having a specific gravity of 1.35 was used as the aqueous solution having a principal component of potassium hydroxide.

This nickel plate was used as the positive electrode to be combined with a negative electrode comprising a sheet type zinc plate, a liquid-proof electrolyte retaining layer comprising cellulose nonwoven fabric and a separator comprising microporous polypropylene, so that a nickel-zinc battery $A_7$ having a nominal capacity of 2.0 Ah was assembled. An aqueous solution having a principal component of potassium hydroxide and having a specific gravity of 1.35 was used as the electrolyte solution. The electrolyte solution was filled up to a level for dipping 90% of volumes of the positive electrode, negative electrode, liquid-proof electrolyte retaining layer and separator.

(COMPARISON EXAMPLE 2)

Before being assembled in the battery, the nickel plate prepared by the comparison example 1 was dipped in the electrolyte solution same with that of the embodiment 7, and subjected to the aging process, and charged and formed. Then, the plate was assembled in the battery in the same way as the embodiment 7 so as to make up a nickel-zinc battery $B_2$.

(COMPARISON EXAMPLE 3)

The nickel plate prepared by the comparison example 1 was assembled in the battery in the same way as the embodiment 7, and subjected to the aging process, and charged and formed so that a nickel-zinc battery $B_3$ was made up.

Figure 6:
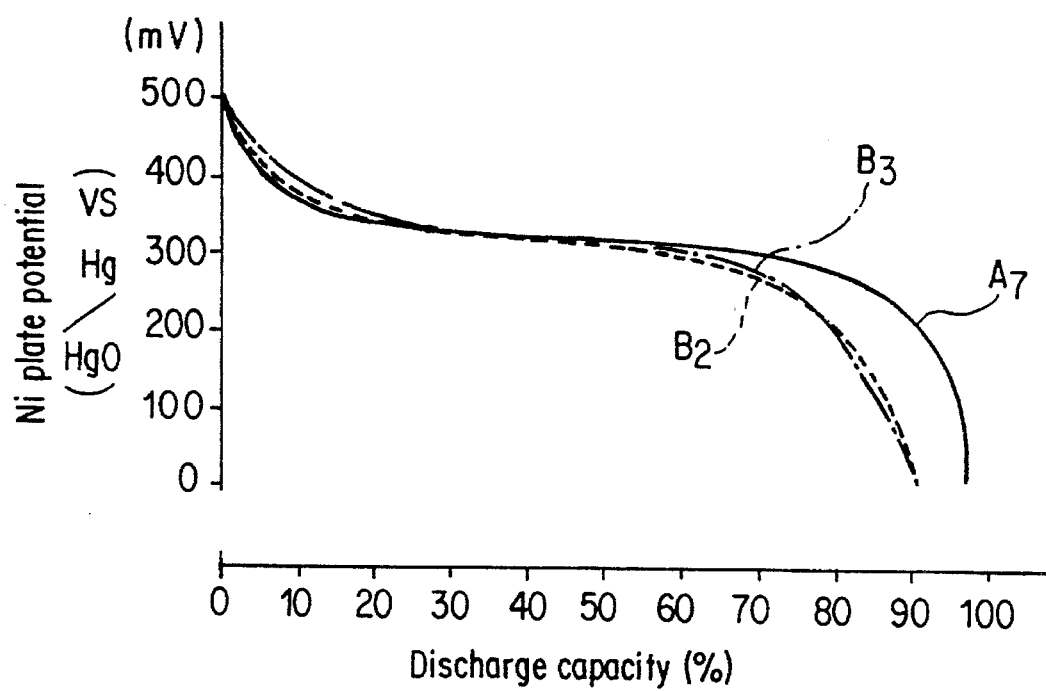
FIG. 6 is a diagram showing discharge voltage characteristics of nickel-zinc batteries using nickel plates of an embodiment 7 and comparison examples 2 and 3, respectively.

The batteries $A_7$, $B_2$ and $B_3$ were subjected to the charge/discharge test so as to investigate their discharge voltage characteristics. The charging was done with a charging current of 3 A for 11 hours, and the discharging was done with a discharging current of 6 A. Results are shown in FIG. 6. Self-discharge amounts after being permitted to stand for 20 days at 40° C. are listed in Table 1.

TABLE 1

| Battery | Self-discharge amount (%) |
|---------|---------------------------|
| $A_7$   | 35                        |
| $B_2$   | 37                        |
| $B_3$   | 60                        |

As is obvious from FIG. 6 and Table 1, the battery $A_7$ is excellent in the discharge voltage characteristic and the self-discharge amount as compared with the batteries $B_2$ and $B_3$. This is because of the same reason with those of the batteries $A_1$ to $A_6$ and because a self-discharge performance of the zinc electrode is excellent from the following reasons. (1) The β-CoOOH is scarcely reversible. (2) A residual quantity of CoO is extremely small. (3) The zinc electrode is scarcely affected by an elution of intermediary product in the midway to get to β-CoOOH.

Same effect as the above was obtained even when the nickel plate of the battery $A_7$ was used after being permitted to stand for a while in air.

(Embodiment 8)

The nickel plate same with that of the embodiment 7 was prepared. This nickel plate was used as a positive electrode to be combined with a negative electrode comprising a pasted type hydrogen absorbing electrode plate and a separator comprising a polyamide nonwoven fabric, so that a nickel metal-hydride battery $A_8$ having a nominal capacity of 2.0 Ah was assembled. A hydrogen absorbing alloy for use in the hydrogen absorbing electrode plate is made of $MmNi_{4.2}Al_{0.3}Co_{0.5}$. Mm is a misch metal forming a mixture of rare earth elements. An aqueous solution having a principal component of potassium hydroxide and having a specific gravity of 1.26 was used as the electrolyte solution. The electrolyte solution was filled up to a level for dipping 90% of volumes of the positive electrode, negative electrode and separator.

(COMPARISON EXAMPLE 4)

The nickel plate prepared by the comparison example 1 was assembled in the battery in the same way as the embodiment 8, and subjected to the aging process, and charged and formed so that a nickel metal-hydride battery $B_4$ was made up.

The batteries $A_8$ and $B_4$ were investigated in regard to the relations between charge/discharge cycle number and active material utilization efficiency. The charging was done with a charging current of 300 mA for 10.5 hours, and the discharge was done with a discharging current of 600 mA with an end voltage of 1.00 V. Results are shown in FIG. 7.

Figure 7:
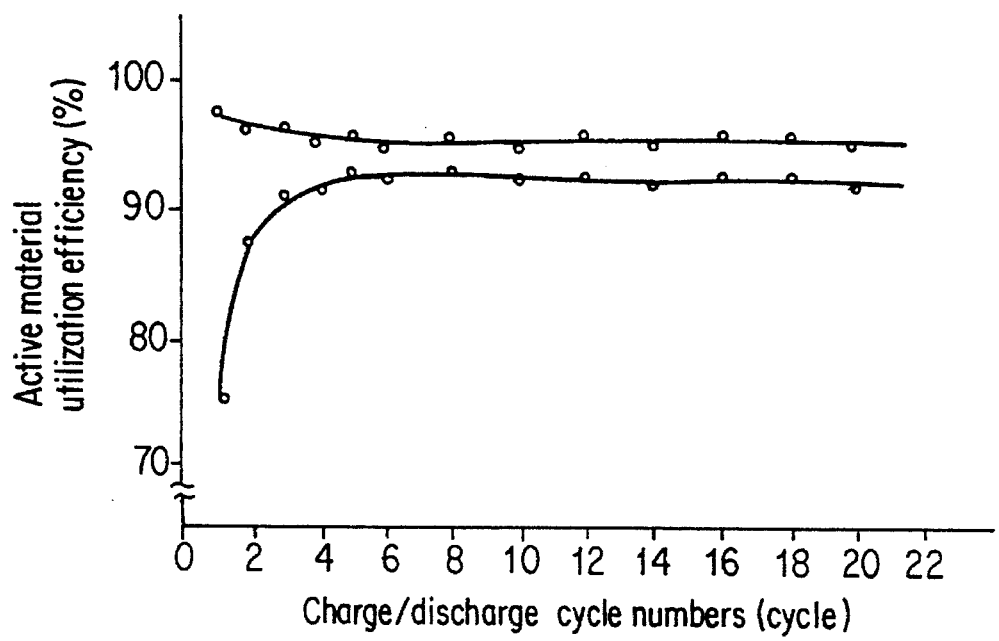
FIG. 7 is a diagram showing relations between charge/discharge cycle numbers and active material utilization efficiencies of nickel metal-hydride batteries using nickel plates of an embodiment 8 and a comparison example 4, respectively.

As seen from FIG. 7, a high active material utilization efficiency is offered from the first cycle in the battery $A_8$. This is because of the same reason with those of the batteries $A_1$ to $A_6$.

(Embodiments 9 to 11)

Nickel plates same with that of the embodiment 2 except for the type were made up, such as a cylinder type, a pocket type and a button type. Nickel-cadmium batteries $A_9$, $A_{10}$ and $A_{11}$ were made up by using these nickel plates.

(COMPARISON EXAMPLES 5 to 7)

A cylinder type nickel plate same with that of the comparison example 1 except for its type was formed, and a nickel-cadmium battery $B_5$ was made up by using this nickel plate. Spherical nickel hydroxide powder including 5 wt% of cadmium hydroxide was mixed with nickel carbonyl powder, and a pocket type nickel plate and a button type nickel plate were made up by using this mixture. Then, nickel-cadmium batteries $B_6$ and $B_7$ were made up by using these nickel plates.

The batteries $A_9$ to $A_{11}$ and $B_5$ to $B_7$ were investigated in regard to the relations between charge/discharge cycle number and active material utilization efficiencies. The charging was done with a charging current of 0.1 CA for 11 hours, and the discharging was done with a discharging current of 0.2 CA. Results are shown in FIG. 8.

Figure 8:
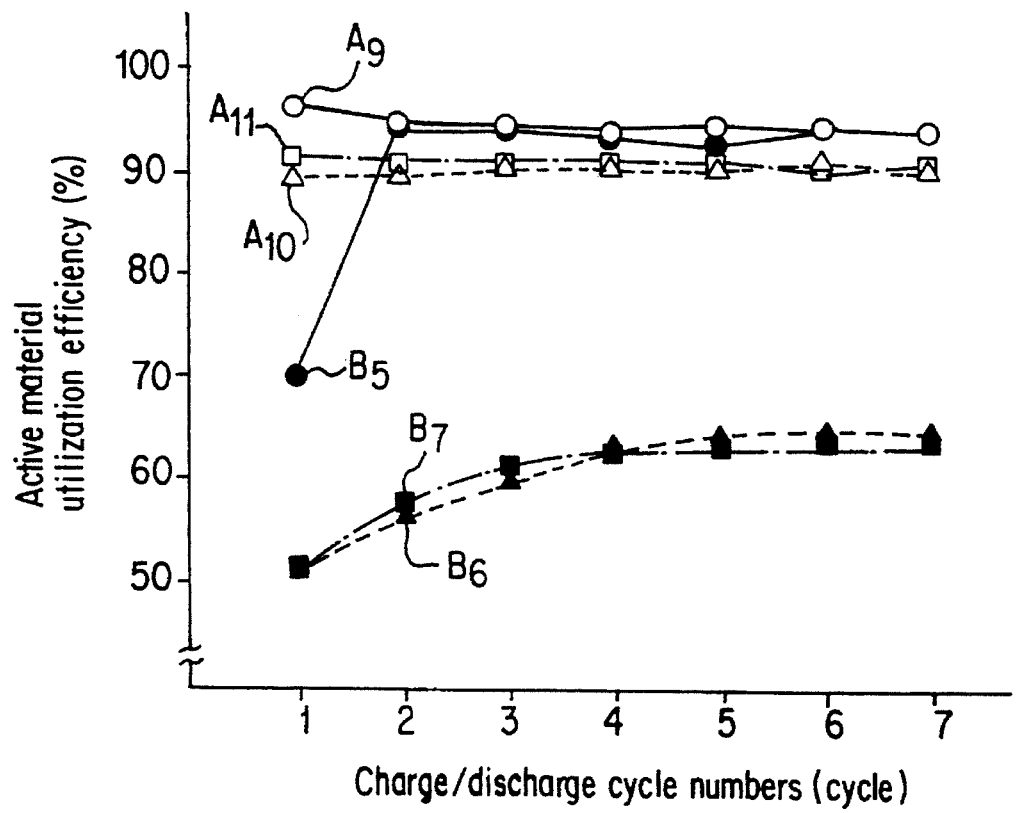
FIG. 8 is a diagram showing relations between charge/discharge cycle numbers and active material utilization efficiencies of nickel-cadmium batteries of types different from the pasted type using nickel plates of embodiments 9 to 11 and comparison examples 5 to 7, respectively.

As seen from FIG. 8, the batteries $A_9$ to $A_{11}$ offered high active material utilization efficiency from the first cycle. This is because of the same reason with those of the batteries $A_1$ to $A_6$.

(Embodiment 12)

A substrate comprising a nickel fiber porous body having a thickness of 1.5 mm and a porosity of 95% was immersed in a plating bath including cobalt diammonium sulfate, ammonium chloride and sodium chloride to be subjected to a plating treatment, so that a cobalt coating with thickness of 0.1 to 0.3 microns was applied on the substrate.

On the other hand, the paste mixture same with that of the embodiment 7 was prepared in the same way as the embodiment 7. This mixture was filled in the substrate plated with cobalt, and dried for 1 hour at 80° C. Then, the filled substrate was pressed and coated with teflon on its surface so as to prepare a nickel plate.

A nickel-zinc battery $A_{12}$ having a structure same with that of the embodiment 7 and a nominal capacity of 10 Ah was made up by using this nickel plate.

The batteries $A_7$ and $A_{12}$ were investigated in regard to the relations between charge/discharge cycle numbers and discharge capacities. The charging was done with a charging current of 0.1 CA for 11 hours, and the discharging was done with a discharging current of 0.2 CA. Results are shown in FIG. 9.

Figure 9:
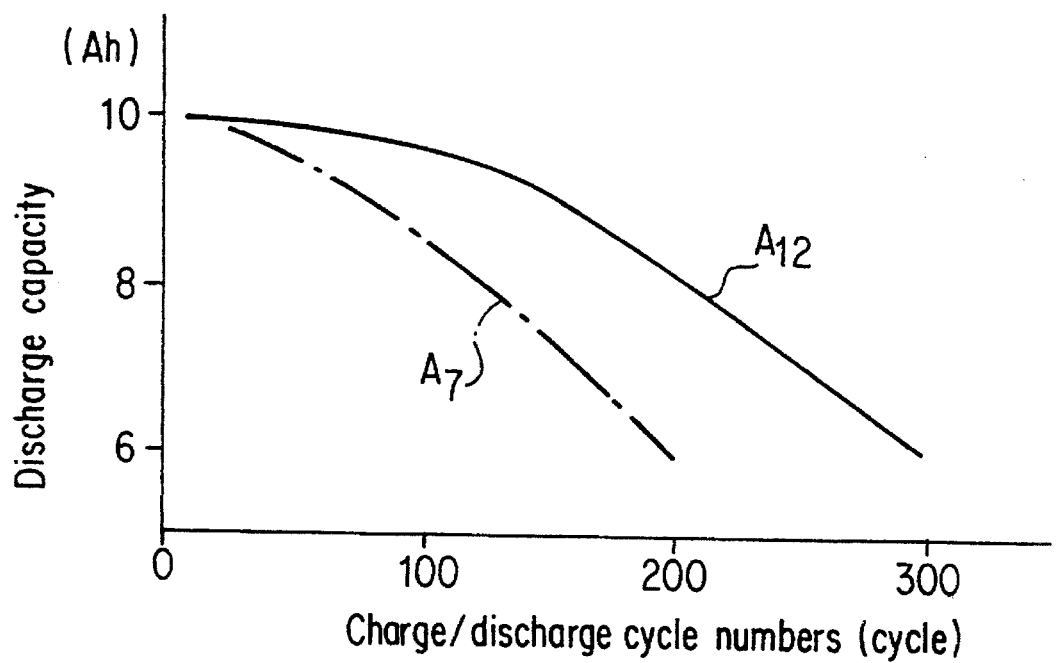
FIG. 9 is a diagram showing relations between charge/discharge cycle numbers and discharge capacities of nickel-zinc batteries using nickel plates of embodiments 7 and 12, respectively.

As seen from FIG. 9, the battery $A_7$ exhausted its service life after 200 cycles, but the battery $A_{12}$ exhausted its service life after 300 cycles. This is because the cobalt plating on the substrate changed to irreversible CoOOH at the first charging and discharging, so that a conductive efficiency between the substrate and the positive active material was made better as compared with that of the battery $A_7$.

As described in the embodiments 1 to 12, the present invention can provide the nickel plate i.e. the alkaline battery which offers the high active material utilization efficiency from the first cycle and is excellent in the discharge characteristic. In the methods of this invention, the aging process and the charging and discharging for formation are not required so that the productivity is made better. Further, the intermediary product in the midway to get to β-CoOOH does not cause the short-circuiting and give bad influences on the zinc electrode. Moreover, since the residual quantity of CoO is small, this method can provide an alkaline battery such as the nickel-zinc battery having a stable performance.

(Another embodiments)

(1) A nickel plate formed by the same method as those of the embodiments 1 and 3 to 6 may be used for the nickel-zinc battery and the nickel metal-hydride battery.

(2) The cobalt plating on the substrate may be applied to a nickel plate formed by a method same with those of the embodiments 1 and 3 to 6.

(3) A foamed nickel may be used for the substrate, and an alkali-resistant metal other than nickel may be used therefor.

(4) $Na_2S_2O_8$, $(NH_4)S_2O_8$ and $H_2O_2$ etc. may be used as the oxidizing agent.

INDUSTRIAL APPLICABILITY

This invention can provide with a good productivity a nickel plate i.e. an alkaline battery which offers a high active material utilization efficiency from a first cycle and is excellent in a discharge characteristic. Therefore, its industrial value is large.

What is claimed is:

1. A method of manufacturing a nickel battery plate, comprising the steps of mixing a positive, active material powder including as the principle component nickel hydroxide with a cobalt compound powder having a grain size no greater than 20 microns and a surface area of at least 10 $m_2/g$, filling this mixture in a three-dimensional porous substrate comprising an alkali-resistant metal, and then oxidizing with an oxidizing agent selected from the group consisting of $K_2S_2O_8$, $Na_2S_2O_8$, $(NH_4)_2S_2O_8$ and $H_2O_2$ so as to form a beta cobalt oxyhydroxide on the surface of the nickel hydroxide powder.

2. A method of manufacturing a nickel battery plate, comprising the steps of mixing a positive active material powder including as the principle component nickel hydroxide with a cobalt compound powder having a grain size no greater than 20 microns and a surface area of at least 10 $m^2/g$, oxidizing with an oxidizing agent selected from the group consisting of $K_2S_2O_8$, $Na_2S_2O_2$, $(NH_4)_2S_2O_8$ and $H_2O_2$ so as to form a beta cobalt oxyhydroxide on the surface of the nickel hydroxide powder, and filling this oxide coated powder (is filled) in a three-dimensional porous substrate comprising an alkali-resistant metal.

3. A method of manufacturing a nickel battery plate, comprising the steps of filling a three-dimensional porous substrate comprising an alkali-resistant metal with a positive active material powder including as a principle component nickel hydroxide, and oxidizing with an oxidizing agent selected from the group consisting of $K_2S_2O_8$, $Na_2S_2O_8$, $(NH_4)_2S_2O_8$ and $H_2O_2$ so as to form a beta cobalt oxyhydroxide on the surface of the nickel hydroxide powder, in a solution containing cobalt ions.

4. A method of manufacturing a nickel battery plate, comprising the steps of forming a solution of a positive active material powder including as the principle component nickel hydroxide and cobalt ions, oxidizing with an oxidizing agent selected from the group consisting of $K_2S_2O_8$, $Na_2S_2O_8$, $(NH_4)_2S_2O_8$ and $H_2O_2$ so as to form a beta cobalt oxyhydroxide on the surface of the nickel hydroxide powder, and filling a three-dimensional porous substrate comprising an alkali-resistant metal with the oxide coated powder.

5. A method of manufacturing a nickel battery plate, comprising the steps of mixing a positive active material powder including as the principle component nickel hydroxide with a beta cobalt oxyhydroxide powder, and filling this mixture in a three-dimensional porous substrate comprising an alkali-resistant metal.

6. A method of manufacturing a nickel battery plate, comprising the steps of forming a solution of a positive active material powder including as the principle component nickel hydroxide and cobalt ions, oxidizing with an oxidizing agent selected from the group consisting of $K_2S_2O_8$, $Na_2S_2O_8$, $(NH_4)_2S_2O_8$ and $H_2O_2$ so as to form a beta cobalt oxyhydroxide on the surface of the nickel hydroxide powder, mixing this oxide coated powder with beta cobalt oxyhydroxide powder, and filling this mixture in a three-dimensional porous substrate comprising an alkali-resistant metal.

7. A manufacturing method of a nickel plate as set forth in claim 5 or claim 6, in which the cobalt oxyhydroxide has a grain size of 50 microns or smaller.

8. A method of manufacturing a nickel battery plate as set forth in any one of claims 1, 2, 3, 4, 5 or 6, in which the substrate is plated with cobalt.

9. A method of manufacturing a nickel battery plate as set forth in any one of claims 1, 2, 3, 4, 5, or 6 in which the substrate is a fiber porous body or a foamed body.

10. A method of manufacturing an alkaline battery, comprising the steps of mixing a positive active material powder including as the principle component nickel hydroxide with a cobalt compound powder having a grain size no greater than 20 microns and a surface area of at least 10 $m^2/g$, filling this mixture in a three-dimensional porous substrate comprising an alkali-resistant metal, and then oxidizing with an oxidizing agent so as to form a beta cobalt oxyhydroxide on the surface of the nickel hydroxide powder, and assembling the prepared nickel plate together with a zinc, metal-hydride, or cadmium electrode.

11. A method of manufacturing an alkaline battery, comprising the steps of mixing a positive active material powder including as the principle component nickel hydroxide with a cobalt compound powder having a grain size no greater than 20 microns and a surface area of at least 10 $m^2/g$, oxidizing with an oxidizing agent so as to form a beta cobalt oxyhydroxide on the surface of the nickel hydroxide powder, and filling this oxide coated powder in a three-dimensional porous substrate comprising an alkali-resistant metal, and assembling the prepared nickel plate together with a zinc, metal-hydride, or cadmium electrode.

12. A method of manufacturing an alkaline battery, comprising the steps of filling a three-dimensional porous substrate comprising an alkali-resistant metal with a positive active material powder including as the principle component nickel hydroxide, and oxidizing with an oxidizing agent in a solution containing cobalt ions so as to form a beta cobalt oxyhydroxide on the surface of the nickel hydroxide powder, and assembling the prepared nickel plate together with a zinc, metal-hydride, or cadmium electrode.

13. A method of manufacturing an alkaline battery, comprising the steps of forming a solution of a positive active material powder including as the principle component nickel hydroxide and cobalt ions, oxidizing with an oxidizing agent so as to form a beta cobalt oxyhydroxide on the surface of the nickel hydroxide powder, and filling this oxide coated powder in a three-dimensional porous substrate comprising an alkali-resistant metal, and assembling the prepared nickel plate together with a zinc, metal-hydride, or cadmium electrode.

14. A method of manufacturing an alkaline battery, comprising the steps of mixing a positive active material powder including as the principle component nickel hydroxide with a beta cobalt oxyhydroxide, and filling this mixture in a three-dimensional porous substrate comprising an alkali-resistant metal, and assembling the prepared nickel plate together with a zinc, metal-hydride, or cadmium electrode.

15. A method of manufacturing an alkaline battery, comprising the steps of forming a solution of a positive active material powder including as the principle component nickel hydroxide and cobalt ions, oxidizing with an oxidizing agent so as to form a beta cobalt oxyhydroxide on the surface of the nickel hydroxide powder, mixing this oxide coated powder with a beta cobalt oxyhydroxide, and filling this mixture in a three-dimensional porous substrate comprising an alkali-resistant metal, and assembling the prepared nickel plate together with a zinc, metal-hydride, or cadmium electrode.

16. The method of claim 10 wherein the electrode is a metal-hydride electrode.

17. The method of claim 11 wherein the electrode is a metal-hydride electrode.

18. The method of claim 12 wherein the electrode is a metal-hydride electrode.

19. The method of claim 13 wherein the electrode is a metal-hydride electrode.

20. The method of claim 14 wherein the electrode is a metal-hydride electrode.

21. The method of claim 15 wherein the electrode is a metal-hydride electrode.

22. The method of claim 10 wherein the electrode is a cadmium electrode.

23. The method of claim 11 wherein the electrode is a cadmium electrode.

24. The method of claim 12 wherein the electrode is a cadmium electrode.

25. The method of claim 13 wherein the electrode is a cadmium electrode.

26. The method of claim 14 wherein the electrode is a cadmium electrode.

27. The method of claim 15 wherein the electrode is a cadmium electrode.

28. The method of claim 10 wherein the electrode is a zinc electrode.

29. The method of claim 11 wherein the electrode is a zinc electrode.

30. The method of claim 12 wherein the electrode is a zinc electrode.

31. The method of claim 13 wherein the electrode is a zinc electrode.

32. The method of claim 14 wherein the electrode is a zinc electrode.

33. The method of claim 15 wherein the electrode is a zinc electrode.

* * * * *